Sept. 23, 1969     J. S. BYE-JORGENSEN ET AL     3,468,795
PROCESS AND PLANT FOR BIOLOGICAL PURIFICATION OF
WASTE WATER AND SEWAGE
Filed March 15, 1968
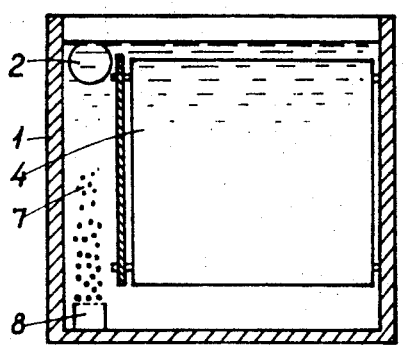
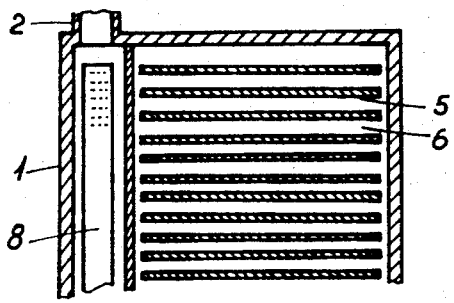
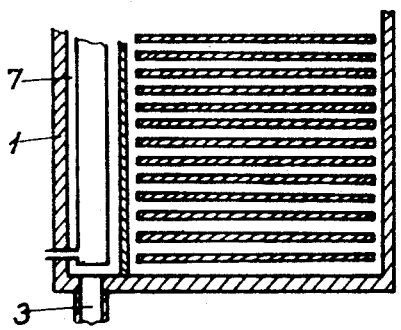
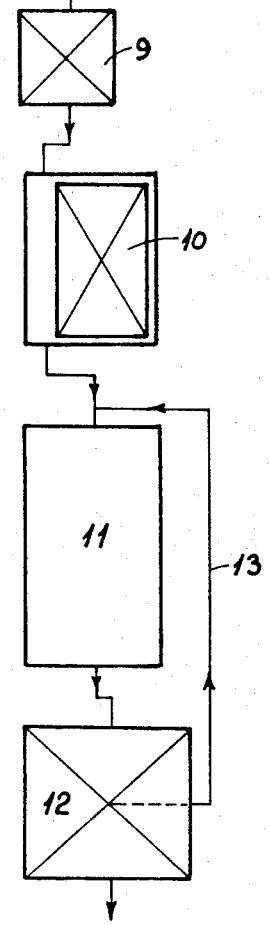

United States Patent Office 3,468,795
Patented Sept. 23, 1969

3,468,795
PROCESS AND PLANT FOR BIOLOGICAL PURIFICATION OF WASTE WATER AND SEWAGE
Jorgen S. Bye-Jorgensen, Humblebaek, and Gunnar H. Larsen, Rungsted, Denmark, assignors to I. Kruger A/S, Copenhagen, Denmark, a firm
Filed Mar. 15, 1968, Ser. No. 713,363
Claims priority, application Denmark, Mar. 17, 1967, 1,409/67, 1,410/67
Int. Cl. C02c 1/10
U.S. Cl. 210—7                3 Claims

ABSTRACT OF THE DISCLOSURE

A contact aerator used for purification of sewage or industrial waste water is provided with air admission and distributing means working in a space outside the contact bed, the water thus aerated being circulated downwardly through the contact bed which has been found effective in preventing clogging of the bed by the coat of microorganisms being formed at a rate superior to the rate in which the said coating can be released and carried forth with the water. Such contact aerators can be advantageously used as a pre-stage of purification prior to treatment by the aerated sludge-process, provided that the sludge formed in the contact aerator and carried forth with the water leaving the said aerator is led directly to the aerated sludge-process. This makes the aerated sludge recirculating in the latter process more concentrated and renders the process in a better position to resist the influence of shock-loads and of variations in the contents of industrial waste.

---

The present invention concerns a method for purifying waste water or sewage in biological purification plants in which contact aeration is made use of. This term when used here and in the following in the specification is intended to mean treatment in a container—in the following referred to as contact aerator—in which one or more contact beds are arranged so as to be immersed in the flow of waste water or sewage to be purified, air being introduced into the waste water or sewage during its passage through the aerator. As a result hereof a film of aerobic microorganisms will soon form on the contact surfaces through the intermediate of which the impurities contained in the waste or sewage are oxidized.

The contact bed or beds may consist of lumps or chips of indifferent material such as cinders or stone, or of regularly shaped bodies of such materials as stone, concrete or the like, either in loose form or in the form of regular built-up piles or stacks. Alternatively the bed or beds may consist of a series of parallel plates of a suitable material such as asbestos cement placed so as to form vertical or slanting interstices. The oxygenation can be achieved by blowing air into the liquid through suitable air distribution members such as perforated tubes or nozzles.

The operation of contact aerators of known construction presents the difficulty that the contact bed tends to be clogged by the biological films growing to such an extent that they impede the passage of air and water. This difficulty has never been overcome in a practical way and consequently contact aerators are nowadays hardly in use anywhere.

The present invention has for its principal object the carrying out of purification of waste water or sewage in contact aerators of the kind above described in such a way that the said difficulties do not occur. This object is achieved according to the invention by carrying the waste water or sewage to be purified through a contact aerator with or without previous or subsequent passage through other purification and clarification members whereby the oxidation by introduction of air into the water passing through the contact aerator is carried out outside the contact bed or contact beds, the water thus aerated or oxidized being caused to circulate through the contact bed or contact beds in downward direction.

Hereby the process according to the present invention differs from the process used in the contact aerators hitherto known in which a mixture of air and water was caused to ascend through the contact bed or beds along the contact surfaces thereof. Surprisingly it has been found that the difficulties owing to the tendency to clog are overcome by using the process according to the present invention. This was not to be expected because it is not possible to utilize in connection with the method according to the present invention the turbulence produced in the liquid by introduction of the air for releasing or detaching parts of the biological films from the contact areas which has been a function to which much weight has hitherto been attached. It has been anticipated that by utilizing said turbulence the growth of the films on the contact surfaces could be kept down but this expectation has not been realized. On the contrary, in long-time-experiments with the method according to the present invention it has been found that the surfaces of the contact beds are capable of keeping themselves clean except for the formation of reasonably thin biological films which are desirable. This has been achieved in spite of the fact that when using the method according to the invention the turbulence occurring as a result of the introduction of air is not utilized and not intended to be utilized for releasing deposited material. A possible explanation of this finding is that the descending flow of water acts in the same direction as the weight of the particles of sludge released from the contact surfaces and thereby facilitates the removal thereof.

The present invention concerns also purification apparatus embodying a contact aerator for carrying out the method described above which apparatus comprises a container having inlet and outlet for waste water or sewage in which liquid one or more contact beds are immersed.

An apparatus according to the invention is thus characteristic in that it comprises a contact aeration member through which the waste water or sewage passes and so constructed that at one or more locations outside the contact bed or contact beds there are provided an aeration space containing admission members for air, said aeration space being connected at the upper and lower parts thereof with spaces at top and bottom of the contact bed or beds in such position that a circulation track is formed by which the oxygen-containing waste water or sewage produced by aeration passes downwards through the contact bed or beds or along the contact areas.

The sludge particles released from the contact areas are carried away by the waste water or sewage. They may be removed therefrom by means of a clarification member inserted in the flow of waste water or sewage after the contact aerator or below the same. The waste water or sewage which has thus been more or less completely clarified may then, according to circumstances, be carried further to a recipient or subjected to further purification, which may also be of biological nature. It may thus consist in, for instance, purification in an activated sludge plant consisting of an aeration tank followed by a clarification member and arranged in such a manner that a certain concentration of sludge is maintained in the aeration tank by partially returning sludge precipitated in the clarification member.

It has, however, been found that in connection with the present invention a number of particular advantages can be achieved if the waste water or sewage, after having been subjected to contact aeration in the manner described above but without having passed a clarification member as described above in which more or less of the sludge carried away from the contact aeration process has been separated, is carried directly to an aeration process in which aeration takes place in absence of contact beds and which works in the known way by means of activated sludge.

This embodiment of the invention is based upon the new apprehension that when a contact aerator as above described is introduced prior to an aeration tank in which treatment of the waste water or sewage with activated sludge is carried out and when at the same time care is taken to ensure that the sludge contained in the water and formed in the contact area is transported with the water directly to the aeration tank, this sludge, against expectation, is particularly valuable in connection with the further purification of the waste water or sewage by aeration and subsequent sedimentation. This is a consequence of the fact that the biological sludge obtained in this manner is particularly advantageous compared with usual activated sludge. Especially, it has considerably less volume than usual, known activated sludge. Activated sludge in the form in which it has hitherto been known contains 1 gram of dry matter in 100–150 cm.$^3$ (i.e. its sludge index is 100–150). Contrary thereto by utilizing sludge derived from the contact aerator as above described activated sludge having a sludge index of 50–60 can be obtained in the aeration tank. Such sludge is considerably cheaper to treat (for instance in a digesting tank) and to dispose of by transportation by wagon, tube or canal or by ship.

Moreover, the use of sludge from a contact aerator ensures an improved reliability in the working of the aeration tank in case of shock-loading, or irregular admission of industrial waste water than does usual activated sludge. The arrangement of a contact aerator in addition to an already present aeration tank adapted to treating dairy waste water and introduction on the sludge therefrom to the aeration tank has thus been shown to highly stabilize the working of the plant in question. These circumstances have the effect that by using the method according to the invention the purification of the waste water or sewage becomes economical and safe. Contributing to the obtainment of this result is the fact that the contact aerator may be comparatively small, the final purification taking place in the substantially greater aeration tank working with activated sludge in which aeration tank there are no comparatively expensive built-in structures as in the contact aerator.

An apparatus for carrying out the method according to the invention may thus comprise a contact aerator, an aeration tank without built-in contact areas and a final clarification tank in connection with which recirculation to the aeration tank of precipitated sludge or purified outlet or both is provided.

The drawing shows by way of example embodiments of the method and apparatus according to the invention. In the drawing:

FIGS. 1 and 2 show in vertical section, and viewed from above, respectively, schematically an embodiment of a contact aerator according the the invention, and FIG. 3 by way of a block diagram, an apparatus or plant for purification of waste water or sewage, utilizing the contact aerator shown in FIGS. 1 and 2.

In FIGS. 1 and 2 the reference number 1 designates a container through which a flow of waste water or sewage is passed, the flow being introduced through an inlet passage 2 and removed through an outlet passage 3 (FIG. 2). In the container there is provided a contact bed 4 which in the embodiment shown consists of vertical plates separated by interstices 6 of equal width.

In the bottom of a part 7 of the container which is not occupied by the contact bed 4 but extends along the side thereof there is provided an air distribution member 8 which in the embodiment shown consists of an air tube in which air can be introduced under pressure and in the upper wall of which there are provided openings through which the air can pass into the part 7 and ascend through the waste water or sewage which passes through the container 1 in the direction from the inlet opening 2 to the outlet opening 3 thereby supplying the waste water or sewage with oxygen; in the container 1 a level of liquid is maintained which is located above the top of the contract bed 4. By the effect of the ascending air there is caused an ascending movement of the liquid within the volume 7 whereas the liquid moves in a downward direction within the contact bed 4 and thus flows through the interstices 6 between the plates in a downward direction causing a circulation. The plates 5 which may be of, for instance, asbestos cement may be replaced by for instance chips or more or less regularly piled shaped bodies, provided that they leave interstices for the descending passage of the liquid. The plates, lumps, chips or formed bodies are supported and kept in place by suitable supporting members not shown. Beds consisting of more or less loose fillings of cinders, stone or other filling bodies may thus be supported by a sieve bottom or grating and may be delimited against the part 7 by a solid wall. On account of the circulation of the waste water or sewage passing through the container particles which have detached from the film of microorganisms, and particles formed on the contact surfaces are carried away with the water when leaving the container 1 through the outlet 3.

In FIG. 3 the reference number 9 designates one or more numbers for pre-purification such as a sand trap, a grating or a sedimentation tank in which separation of coarse impurities such as sand and paper takes place. From the pre-purification members the waste water or sewage is carried to a contact aerator of the kind described above and designated in FIG. 3 by the reference number 10. The outflow from the contact aerator is carried with its contents of dispersed material to an aerating tank 11. The material, which the liquid carries with it, contains as its most important constituent microbiological sludge which has been formed by the biological oxydation within the contact bed 10 caused by the contact of the water or sewage with the surfaces covered by a film or microorganisms. It consists partially of released parts of the said film whereby a film of suitable thickness is constantly maintained on the surface of the contact bed. This sludge is a supplement which, as explained above, is very important for the effect of the aeration tank 11. The aeration tank 11 is followed by a final separation tank 12 in which the water leaving the aeration tank is clarified and sludge is separated. A proportional part of this sludge is returned to the aeration tank 11 through a tube 13. The aeration tank may be of conventional construction and may be supplied with air in various ways, for instance by openings in or diffusors on tubes carrying air under pressure and arranged at the bottom of the tank or the air may be supplied by whipping air into the liquid by means of suitable mechanical means such as rotating drums or spray wheels.

What is claimed is:

1. A method for purifying waste water or sewage comprising providing a contact aerator having a contact bed made up of spaced, sheet-like members and an aeration compartment adjacent to said contact bed, introducing air into said aeration compartment in an upward direction and causing said waste or sewage water to circulate through said contact bed in a downward direction to facilitate rapid removal of growth from the contact bed, transferring said waste water with all the sludge contained therein directly to an aeration tank, providing a clarification tank downstream of said aeration tank, and recirculating sludge from said clarification tank to maintain a desired concentration of activated sludge in said aeration tank.

2. A plant for purification of waste water or sewage comprising a contact aerator having a compartment containing a contact bed and an aeration compartment adjacent to said contact bed, means for admitting air to said aeration compartment in an upward direction thereby causing said waste or sewage water to circulate through said contact bed in a downward direction, a conduit for admitting waste water or sewage to said contact aerator, an outlet conduit for conducting all the waste or sewage in said contact aerator from the latter directly to an aeration tank, a clarification tank downstream of said aeration tank, a recirculation line carrying sludge from said clarification tank into said aeration tank, and separate outlet means on said clarification tank for clarified water and for excess sludge.

3. A plant for purification of waste water or sewage as set forth in claim 2 wherein said contact bed comprises a plurality of spaced, substantially vertically disposed sheet-like members.

References Cited
UNITED STATES PATENTS 3,402,125   9/1968   Tanaka _____ 210–7

OTHER REFERENCES

Metcalf, L., et al.: American Sewage Practice, vol. III, Disposal of Sewage, Third Edition, 1935, pp. 467–476.

MICHAEL E. ROGERS, Primary Examiner

U.S. Cl. X.R.
210—17, 150, 195